(12) United States Patent
Sano et al.

(10) Patent No.: US 11,826,866 B2
(45) Date of Patent: Nov. 28, 2023

(54) TOOL CONVEYING DEVICE

(71) Applicant: MAKINO MILLING MACHINE CO., LTD., Tokyo (JP)

(72) Inventors: Yuji Sano, Yamanashi (JP); Kenji Katsumata, Yamanashi (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 300 days.

(21) Appl. No.: 17/290,106

(22) PCT Filed: Oct. 31, 2018

(86) PCT No.: PCT/JP2018/040592
§ 371 (c)(1),
(2) Date: Apr. 29, 2021

(87) PCT Pub. No.: WO2020/090052
PCT Pub. Date: May 7, 2020

(65) Prior Publication Data
US 2021/0394321 A1    Dec. 23, 2021

(51) Int. Cl.
*B23Q 3/157* (2006.01)
*B23Q 3/155* (2006.01)

(52) U.S. Cl.
CPC ....... *B23Q 3/15773* (2013.01); *B23Q 3/1572* (2013.01); *B23Q 3/15553* (2013.01);
(Continued)

(58) Field of Classification Search
CPC ......... Y10T 483/1752; Y10T 483/1757; Y10T 483/176; Y10T 483/1762; Y10T 483/1764;
(Continued)

(56) References Cited

U.S. PATENT DOCUMENTS 4,399,603 A * 8/1983 Reed ................... B23Q 3/15773
74/813 L
5,554,087 A  9/1996 Hwang et al.
(Continued)

FOREIGN PATENT DOCUMENTS

FR   2564355 A * 11/1985 ........... B23Q 3/1554
JP   09192966 A *  7/1997
(Continued)

*Primary Examiner* — Erica E Cadugan
*Assistant Examiner* — Michael Vitale
(74) *Attorney, Agent, or Firm* — MORRISON & FOERSTER LLP

(57) ABSTRACT

This tool conveying device is provided with an indexing device comprising an input shaft, a first output shaft, and a second output shaft which is positioned adjacent and parallel to the first output shaft, wherein the input shaft is linked to a servo motor, the first output shaft rotates during rotation of the input shaft and the second output shaft stops at a prescribed angular position in a certain period during rotation of the input shaft and rotates in the remaining period during said rotation of the input shaft; a gripper; a turning part which is driven by the second output shaft of the indexing device and which supports the gripper; and a gripper opening/closing member which is driven by the first output shaft of the indexing device.

1 Claim, 9 Drawing Sheets

(52) U.S. Cl.
CPC ........... *B23Q 2003/15532* (2016.11); *B23Q 2003/155404* (2016.11); *Y10S 483/902* (2013.01); *Y10T 483/176* (2015.01); *Y10T 483/1776* (2015.01); *Y10T 483/1864* (2015.01); *Y10T 483/1882* (2015.01)

(58) Field of Classification Search
CPC ......... Y10T 483/1776; Y10T 483/1781; Y10T 483/1864; B23Q 3/15773; B23Q 2003/15532; B23Q 2003/155404; B23Q 2003/155411; B23Q 3/1554; B23Q 3/15553; Y10S 483/902
USPC ...... 483/38, 40, 41, 42, 43, 48, 50, 65, 902; 294/110.2, 203
See application file for complete search history.

(56) References Cited

U.S. PATENT DOCUMENTS

| | | | | |
|---|---|---|---|---|
| 5,704,885 | A * | 1/1998 | Lee .................... | B23Q 3/15526 483/65 |
| 2004/0029691 | A1* | 2/2004 | Maeda ............... | B23Q 3/15526 483/38 |
| 2021/0025483 | A1* | 1/2021 | Lawlor ................ | E04H 4/0006 |

FOREIGN PATENT DOCUMENTS

| | | | |
|---|---|---|---|
| JP | H9-300157 A | | 11/1997 |
| JP | 2002046038 A | * | 2/2002 |

* cited by examiner

TOOL CONVEYING DEVICE

CROSS-REFERENCE TO RELATED APPLICATIONS

This application is a US National Stage Application under 35 USC 371 of International Patent Application No. PCT/JP2018/040592, filed Oct. 31, 2018, the entire contents of which is incorporated herein by reference.

FIELD OF THE DISCLOSURE

The present disclosure relates to a tool conveying device.

BACKGROUND OF THE DISCLOSURE

Machine tools may have a tool exchange device in which a plurality of tools are held for exchanging the tool attached to a spindle. For example, Patent Literature 1 discloses a vertical machining center comprising a tool exchange device. In the vertical machining center, the axis of rotation of the spindle is along the vertical direction. The tool exchange device of Patent Literature 1 comprises a tool magazine for holding a plurality of tools and a tool transfer device. The tool magazine has a plurality of holders for holding tool pots. In each holder, a tool is held in the tool pot so that the axis of rotation thereof is 90° with respect to the axis of rotation of the spindle. Prior to attachment to the spindle, the tool held in the tool magazine is rotated 90° along with the tool pot by the tool transfer device so that the axis of rotation thereof is parallel to the axis of rotation of the spindle. For this purpose, a tool rotation device comprises a plate cam in which a cam groove is formed, a bracket which rotates about the axis of rotation of the plate cam, a pot gripper which rotates with the bracket, and a cylinder for rotating the bracket and the pot gripper. A cam follower which engages with the cam groove of the plate cam is attached to the pot gripper. The linear motion of the cylinder is converted into rotational motion by the cam groove of the plate cam and the cam follower of the pot gripper. Due to such a tool rotation device, the tool held in the tool magazine is rotated 90° prior to attachment to the spindle.

Patent Literature

[PTL 1] Japanese Unexamined Patent Publication (Kokai) No. 9-300157

BRIEF SUMMARY OF THE DISCLOSURE

In the field of machine tools, making each component compact in order to reduce the installation area is desired. Thus, an object of the present invention is to provide a compact tool conveying device.

An aspect of the present disclosure provides a tool conveying device for conveying a tool pot in which a tool is held between a tool magazine and a secondary tool standby position, the tool pot being turned so that an axis of rotation of the tool is at a predetermined angle to an axis of rotation of a spindle in the tool magazine and so that the axis of rotation of the tool is parallel to the axis of rotation of the spindle in the secondary tool standby position, the tool conveying device comprising an indexing device comprising an input shaft, a first output shaft, and a second output shaft, the input shaft being connected to a servo motor, the first output shaft rotating while the input shaft rotates, the second output shaft stopping at a predetermined angular position in a certain part of a period during which the input shaft rotates and rotating during the remaining part of the period, a gripper which is capable of opening and closing so as to clamp or unclamp the tool pot, a turning part which is driven by the second output shaft of the indexing device and which supports the gripper, the gripper being turned between the tool magazine and the secondary tool standby position by rotation of the second output shaft of the indexing device, and a gripper opening and closing member which is driven by the first output shaft of the indexing device, and which is configured so as to open the gripper while the second output shaft of the indexing device is stopped and close the gripper while the second output shaft of the indexing device rotates.

In the tool conveying device according to the aspect of the present disclosure, the turning operation and clamping operation of the tool pot can be continuously realized by a single servo motor using the indexing device having the first output shaft and the second output shaft. Thus, a compact tool conveying device can be provided.

The second output shaft of the indexing device may be positioned adjacent and parallel to the first output shaft, the tool conveying device may comprise a first gear provided on the first output shaft of the indexing device, and a second gear arranged so as to be concentric with the second output shaft of the indexing device and to rotate independently of the second output shaft, the second gear being driven by the first gear and transmitting rotation of the first output shaft of the indexing device to the gripper opening and closing member, the gripper opening and closing member may have a cam groove formed so as to open the gripper while the second output shaft of the indexing device is stopped and close the gripper while the second output shaft of the indexing device rotates, and the gripper may have a cam follower engaged with the cam groove of the gripper opening and closing member. In this case, since the first output shaft and the second output shaft of the indexing device are arranged adjacent to each other, the installation area of the indexing device is small. Furthermore, since the second gear, which transmits the rotation of the first output shaft of the indexing device to the gripper opening and closing member, is arranged concentric with the second output shaft, no additional space is needed for arrangement of the second gear. Thus, a more compact tool conveying device can be provided. Furthermore, the opening and closing of the gripper is achieved by the cam groove and the cam follower. Thus, the opening and closing of the gripper can be realized with a simple structure.

According to the aspect of the present disclosure, a compact tool conveying device can be provided.

DETAILED DESCRIPTION OF THE DISCLOSURE

A tool conveying device according to an embodiment will be described with reference to the attached drawings. Identical or corresponding elements have been assigned the same reference sign, and duplicate descriptions thereof have been omitted. In order to facilitate understanding, the scales of the drawings have been changed in some cases, and constituent elements shown in certain drawings may be omitted in other drawings.

Figure 1:
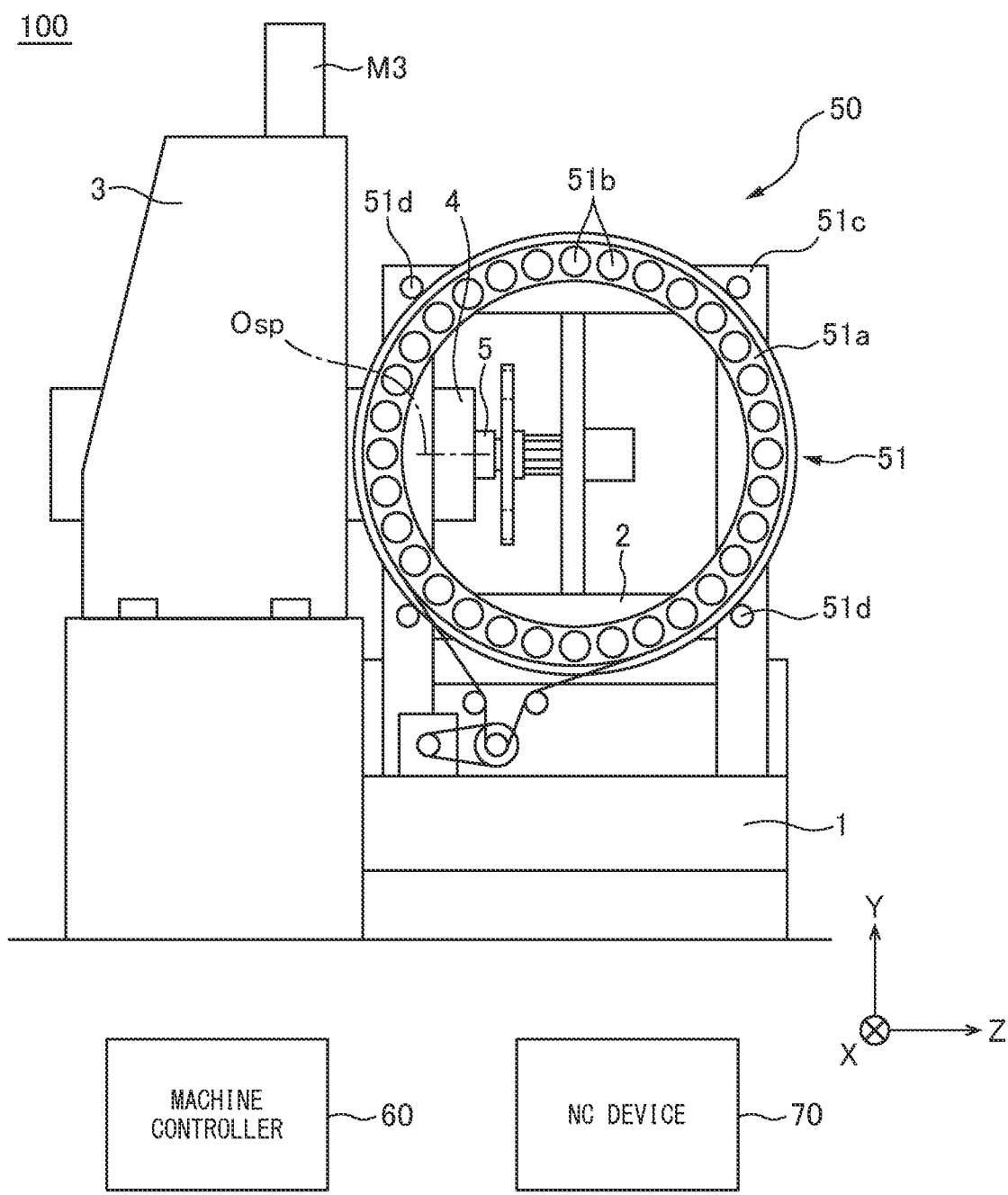
FIG. 1 is a schematic side view showing a machine tool comprising a tool conveying device according to an embodiment.

FIG. 1 is a schematic side view showing a machine tool 100 comprising the tool conveying device according to the embodiment. The machine tool 100 can be, for example, a horizontal machining center, and the axis of rotation Osp of a spindle 5 is set in the horizontal direction. The machine tool 100 may be vertical, or may be a machine tool other than a machining center. The machine tool 100 can comprise, for example, a bed (base) 1, a table 2, a column 3, a spindle head 4, the spindle 5, a tool exchange device 50, a machine controller (controller) 60, and an NC device 70. The machine tool 100 may further include other constituent elements.

Regarding the machine coordinate system of the machine tool 100, the direction parallel to the axis of rotation Osp is the Z-axis direction (also referred to as the front-rear directions). With respect to the column 3, the side on which the table 2 is arranged is the front, and the side opposite thereto is the rear. The vertical direction is the Y-axis direction (also referred to as the up-down directions), and the direction perpendicular to both the Z-axis and the Y-axis is the X-axis direction (also referred to as the left-right directions).

The bed 1 is installed on, for example, the floor of a factory. The table 2 supports a workpiece. The workpiece can be directly attached to the table 2 with a jig, or in another embodiment, the workpiece may be indirectly attached to the table 2 via a pallet. The table 2 is arranged so as to be movable on the bed 1.

Figure 2:
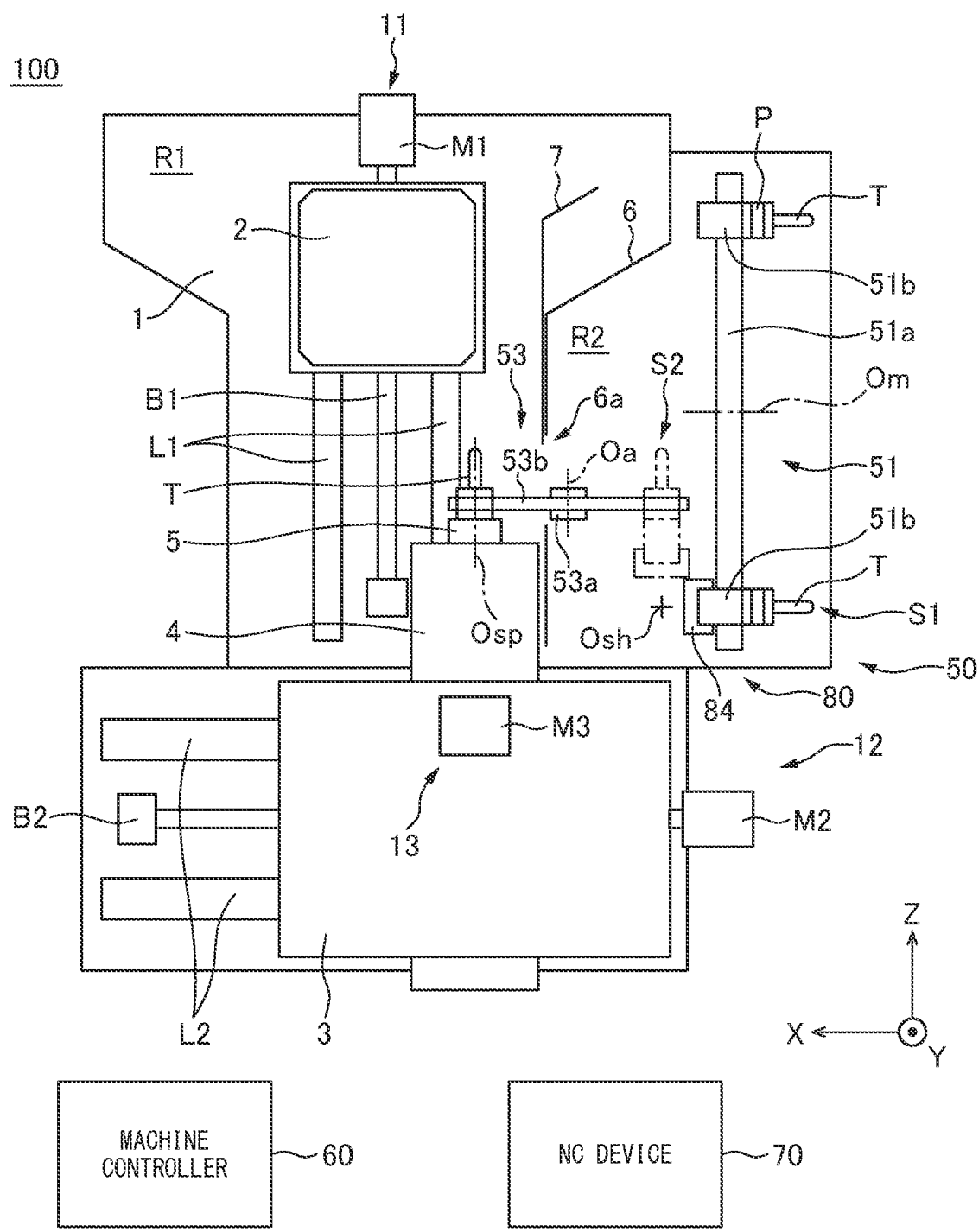
FIG. 2 is a schematic plan view showing the machine tool.

FIG. 2 is a schematic plan view showing the machine tool 100. The machine tool 100 comprises a Z-axis drive device 11 which moves the table 2 along the Z-axis on the bed 1. The Z-axis drive device 11 has a pair of linear guides L1 arranged on the bed 1 along the Z-axis, and moves the table 2 on the rails of the linear guides L1. The Z-axis drive device 11 further comprises a ball screw B1 connected to the table 2, and a motor M1 for rotating the ball screw B1. The feeding of the table 2 in the Z-axis direction by the Z-axis drive device 11 is controlled by the NC device 70.

The column 3 is movably arranged on the bed 1 so as to face the table 2 in the Z-axis direction. The machine tool 100 comprises an x-axis drive device 12 which moves the column 3 along the X-axis. The X-axis drive device 12 has a pair of linear guides L2 arranged on the bed 1 along the X-axis, and moves the column 3 on the rails of the linear guides L2. The X-axis drive device 12 further comprises a ball screw B2 connected to the column 3, and a motor M2 for rotating the ball screw B2. The feeding of the column 3 in the X-axis direction by the X-axis drive device 12 is controlled by the NC device 70.

The spindle head 4 is movably arranged on the column 3. The spindle head 4 penetrates from the front surface to the rear surface of the column 3. The machine tool 100 comprises a Y-axis drive device 13 which moves the spindle head 4 along the Y-axis. The Y-axis drive device 13 includes a linear guide (not illustrated) arranged on the column 3 along the Y-axis, and moves the spindle head 4 on the rails of the linear guide. The Y-axis drive device 13 further comprises a ball screw (not illustrated) connected to the spindle head 4 and a motor M3 for rotating the ball screw. The feeding of the spindle head 4 in the Y-axis direction by the Y-axis drive device 13 is controlled by the NC device 70.

The spindle 5 is rotatably arranged in the interior of the spindle head 4. The spindle 5 retains a tool T. The rotation of the spindle 5 is controlled by the NC device 70.

The machine tool 100 comprises a machining chamber R1 for machining the workpiece and a tool storage chamber R2 for holding a plurality of tools T. The machining chamber R1 and the tool storage chamber R2 are partitioned by a splashguard 6. The splashguard 6 prevents the scattering of coolant and swarf out of the machining chamber R1. An opening 6a for the passage of the tool T during tool exchange is defined in the splashguard 6. A shutter 7 is provided in the opening 6a. It should be noted that in order to facilitate understanding, the splashguard 6 and the shutter 7 have been omitted in FIG. 1.

Referring to FIG. 2, the tool exchange device 50 is configured so as to hold a plurality of tools T and exchange the tool T attached to the spindle 5. The tool exchange device 50 is provided in the tool storage chamber R2. The tool exchange device 50 has a tool magazine 51, a shifter (tool conveying device) 80, and an arm 53.

The tool magazine 51 holds a plurality of tools T. The tool magazine 51 holds the tool T so that the axis of rotation of the tool T is at a predetermined angle (for example, 90°) relative to the axis of rotation Osp of the spindle 5. In another embodiment, the tool T may be held relative to the axis of rotation Osp of the spindle 5 at a predetermined non-parallel angle other than 90°.

The tool magazine 51 comprises, for example, a magazine body 51a and a plurality of tool pot holding parts 51b. Referring to FIG. 1, the magazine body 51a is of a ring type and has a substantially annular shape or circular endless shape (or a closed linear shape). The magazine body 51a is arranged on the side of the spindle 5 so that the endless shape thereof lies along the YZ plane. The direction of arrangement of the magazine body 51a is not limited thereto.

The magazine body 51a can be rotatably supported by, for example, a plurality of rollers 51d provided on a frame 51c. The magazine body 51a is connected to a drive device such as a motor via a belt, chain, and/or gears (not illustrated). Referring to FIG. 2, the magazine body 51a is configured so as to rotate about an axis of rotation Om parallel to the X-axis direction. The rotation of the magazine body 51a is controlled by the machine controller 60.

The plurality of tool pot holding parts 51b are arranged along the endless shape of the magazine body 51a. Thus, as the magazine body 51a rotates, the plurality of tool pot holding parts 51b move in a circular circulation path (or endless path) along the YZ plane. The tool magazine 51 is configured so as to position a selected tool pot holding part 51b in a selection position S1.

Each of the tool pot holding parts 51b removably holds a tool pot P. The tool pot holding parts 51b can include, for example, elastic means such as leaf springs for holding the tool pots P. The tool pots P removably hold tools T using a well-known means (not illustrated).

As described above, the tool magazine 51 of the present embodiment is of a ring type. However, in another embodiment, the tool magazine may be of a chain type in which the plurality of tool pot holding parts are attached to a chain. Furthermore, in yet another embodiment, the tool magazine may be of a matrix type in which the tool pots are held in a matrix-like shape. The tool magazine may be of another type.

The shifter 80 is configured so as to convey a tool pot P between a tool pot holding part 51b in the selection position S1 of the tool magazine 51 and a secondary tool standby position S2. The shifter 80 is arranged between the spindle 5 and the tool magazine 51. The shifter 80 turns a tool pot P about the axis of rotation Osh so that the axis of rotation of the tool T is at a predetermined angle (for example, 90°) relative to the axis of rotation Osp of the spindle 5 in the tool magazine 51, and so that the axis of rotation of the tool T is parallel to the axis of rotation Osp of the spindle 5 in the secondary tool standby position S2. The shifter 80 has a claw-like gripper 84 which can clamp and unclamp the tool pot P.

The secondary tool standby position S2 is positioned at the same angle as the selection position S1 in the circumferential direction of the tool magazine 51. Furthermore, the secondary tool standby position S2 is positioned more inside than the selection position S1 in the radial direction of the tool magazine 51. The rotation angle between the selection position S1 and the secondary tool standby position S2 about the axis of rotation Osh is, for example, 90°. The rotation angle between the selection position S1 and the secondary tool standby position S2 can be changed in accordance with the holding angle of the tool T in the tool magazine 51. The rotational motion of the shifter 80 is driven (the details of which are described later) by a servo motor 81 (refer to FIG. 3). Referring to FIG. 2, the rotational motion of the shifter 80 is controlled by the machine controller 60.

The arm 53 exchanges the tool T between the spindle 5 and the tool pot P in the secondary tool standby position S2. The arm 53 is arranged between the spindle 5 and the shifter 80. The arm 53 can rotationally move about an axis of rotation Oa parallel to the axis of rotation Osp of the spindle 5 and translationally move along the axis of rotation Oa.

The arm 53 comprises a shaft part 53a and an arm part 53b. The shaft part 53a extends along the axis of rotation Oa. The arm part 53b extends radially from the shaft part 53a on both sides thereof, and includes two grippers at the ends thereof for gripping tools.

The machine controller 60 controls the motions of the tool exchange device 50 based on a control program. Furthermore, the machine controller 60 can control the motions of other machine constituent elements in the machine tool 100 other than the constituent elements (for example, the X-axis drive device 12, the Y-axis drive device 13, the Z-axis drive device 11, the spindle 5, etc.) controlled by the NC device 70. The machine controller 60 can comprise, for example, a processor, a memory, an input device, a display device, and an interface, and these constituent elements are connected to each other by, for example, busses.

The NC device 70 is configured so as to control the X-axis drive device 12, the Y-axis drive device 13, the Z-axis drive device 11, and the spindle 5 described above based on an NC program. The NC device 70, like the machine controller 60, can include constituent elements such as, for example, a processor, memory, an input device, a display device, and an interface. The machine controller 60 and the NC device 70 may be capable of communicating with each other, and can collaborate when necessary.

Next, the shifter 80 will be described in detail.

Figure 3:
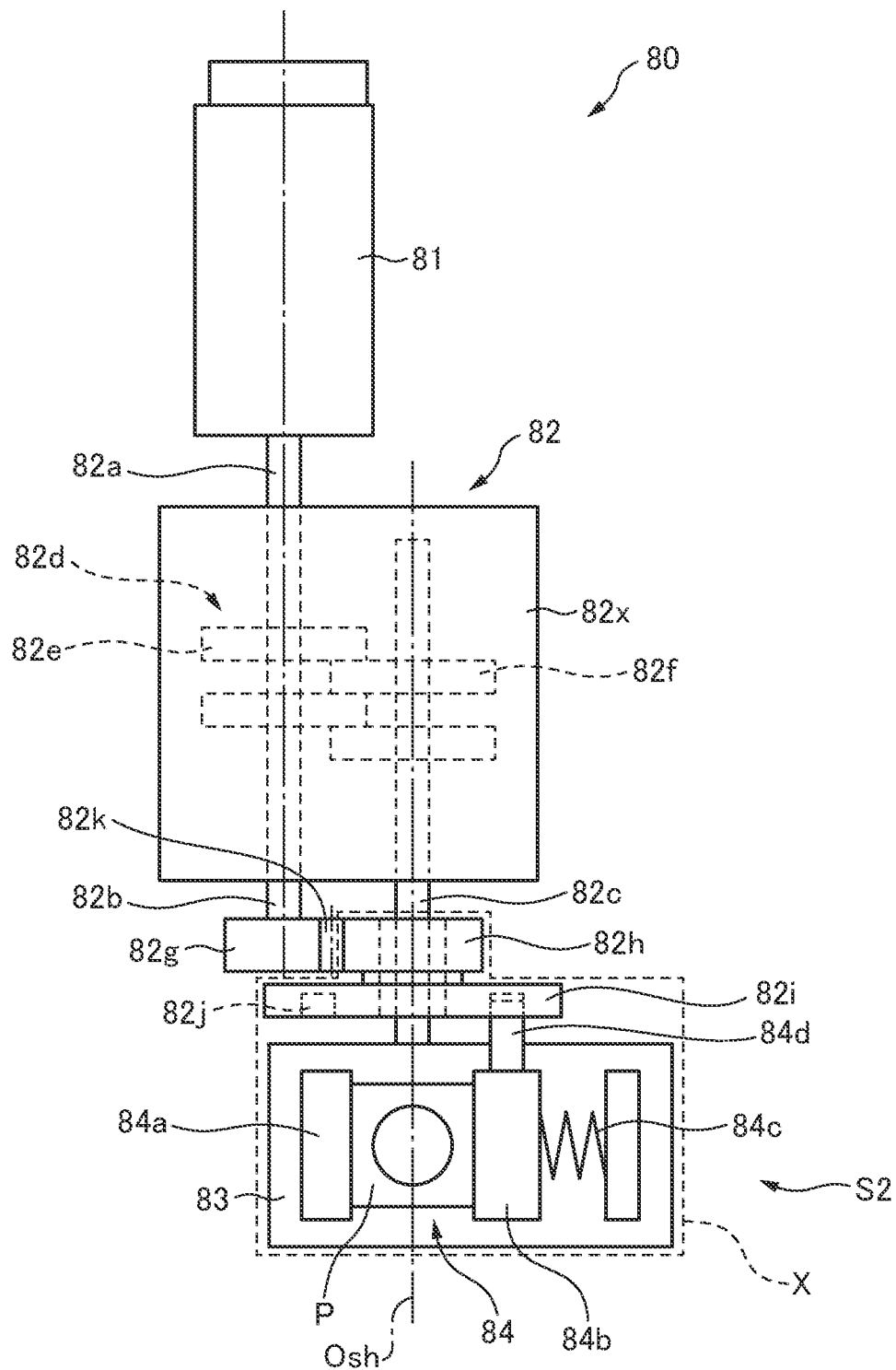
FIG. 3 is a schematic side view showing the tool conveying device.

FIG. 3 is a schematic side view showing the shifter 80. Note that FIG. 2 is a plan view and shows only the gripper 84, regarding the shifter 80, while FIG. 3 is a side view, and shows the gripper 84 as well as other constituent elements of the shifter 80 other than the gripper 84. The shifter 80 includes the servo motor 81, an indexing device 82, a turning part 83, and the gripper 84.

The servo motor 81 is controlled by the machine controller 60. The servo motor 81 has an encoder, and a rotational position signal from the encoder is sent to the machine controller 60. Since the servo motor 81 is used as the drive device of the shifter 80, even when the shifter 80 performs an emergency stop, the machine controller 60 can calculate the angular position of the gripper 84 (the details of which are described later). Furthermore, since the servo motor 81 is used as the drive device of the shifter 80, the machine controller 60 can change the turning speed of the gripper 84 depending on various factors such as, for example, the weight of the tool T.

The indexing device 82 includes an input shaft 82a, a first output shaft 82b, a second output shaft 82c, and a housing 82x in which these shafts are rotatably attached. The input shaft 82a is connected to a shaft of the servo motor 81. The first output shaft 82b is arranged parallel to the input shaft 82a. More specifically, the first output shaft 82b is positioned on an extension of the input shaft 82a. The second output shaft 82c is positioned adjacent and parallel to the first output shaft 82b. Furthermore, the second output shaft 82c is arranged so that the center axis thereof is positioned on the axis of rotation Osh described above.

The indexing device 82 includes an indexing mechanism 82d which is configured so as to rotate the first output shaft 82b while the input shaft 82a rotates and so as to stop the second output shaft 82c in a predetermined angular position during a certain part period in which the input shaft 82a rotates and rotate the second output shaft 82c in the remaining period (i.e., the second output shaft 82c is stopped at the predetermined angular position in a certain range of the rotation angles of the input shaft 82a). It should be noted that as used herein, the term "stop" includes both stopping completely at a certain position as well as moving away from a certain position very slowly, thus being considered to be substantially stopped. The indexing mechanism 82d is held inside a housing 82x.

In the present disclosure, the part of the period during which the input shaft 82a rotates, in which part the second output shaft 82c stops may be referred to as an "indexing characteristic." Such indexing characteristics can be stored in, for example, the memory of the machine controller 60. The machine controller 60 can calculate the angular position of the second output shaft 82c (as well as the turning part 83 and the gripper 84, which are affixed to the second output shaft 82c) based on the rotational position signal of the servo motor 81 from the encoder and the indexing characteristics stored in the memory.

For example, the indexing mechanism 82d can include a cam mechanism. More specifically, the indexing mechanism 82d includes a cam 82e and a cam follower 82f.

The cam 82e is arranged on a shaft connecting the input shaft 82a and the first output shaft 82b. The cam follower 82f is arranged on the second output shaft 82c and is arranged so as to engage the cam 82e. The second output shaft 82c rotates in the direction opposite that of the input shaft 82a due to the engagement between the cam 82e and the cam follower 82f. The cam 82e and the cam follower 82f are shaped so that, due to the engagement therebetween, the second output shaft 82c stops at a predetermined angular position during a certain part of the period in which the input shaft 82a rotates and so that the second output shaft 82c rotates at the same rotational speed (or at a different rotational speed) as the rotational speed of the input shaft 82a during the remaining part of the period.

In the present embodiment, as described above, the indexing mechanism 82d includes a cam mechanism. However, it should be noted that in another embodiment, the indexing mechanism 82d may include other mechanisms. For example, the indexing mechanism 82d can include a plurality of gears, and due to the plurality of gears in combination, the input shaft 82a, the first output shaft 82b, and the second output shaft 82c may move in the same manner as described above.

A first gear 82g is affixed to the first output shaft 82b and rotates along with the first output shaft 82b. A second gear 82h is attached to the second output shaft 82c. The second gear 82h can be rotatably attached to the second output shaft via, for example, a bearing element (not illustrated) such as a roller bearing or a plain bearing, and as a result, rotates independently of the second output shaft 82c. The second gear 82h is arranged concentric with the second output shaft 82c.

A third gear 82k is arranged between the first gear 82g and the second gear 82h. The third gear 82k can be rotatably attached to any fixed constituent element such as, for example, the housing 82x. The third gear 82k meshes with both the first gear 82g and the second gear 82h and transmits the rotation of the first output shaft 82b to the second gear 82h. Due to the engagement between the first gear 82g and the third gear 82k and the engagement between the third gear 82k and the second gear 82h, the second gear 82h rotates in the same direction as the input shaft 82a. The gear ratio between the first gear 82g and the third gear 82k and the gear ratio between the second gear 82h and the third gear 82k may be set in accordance with various factors. These gear ratios can be stored in, for example, the memory of the machine controller 60. The machine controller 60 can calculate the angular position of the second gear 82h (and a gripper opening and closing member 82i (which is described in detail later) affixed to the second gear 82h) based on the rotational position signal of the servo motor 81 from the encoder and the gear ratios.

The gripper opening and closing member 82i is affixed to the second gear 82h, and rotates along with the second gear 82h. When the first output shaft 82b of the indexing device 82 rotates, the second gear 82h and the gripper opening and closing member 82i affixed to the second gear 82h rotate via the first gear 82g and the third gear 82k. In this manner, the gripper opening and closing member 82i is driven by the first output shaft 82b of the indexing device 82. The gripper opening and closing member 82i has a substantially disc-like shape and is arranged concentrically with the second output shaft 82c. The gripper opening and closing member 82i can be rotatably attached to the second output shaft via, for example, a bearing element (not illustrated) such as a roller bearing or a plain bearing, or alternatively, can be separate from the second output shaft, and as a result, rotates independently of the second output shaft 82c. The gripper opening and closing member 82i has a cam groove 82j (which will be described in detail later) formed so as to open the gripper 84 at a predetermined angular position and close the gripper 84 at the remaining angular positions.

The turning part 83 is affixed to the second output shaft 82c of the indexing device 82. The turning part 83 supports the gripper 84. The turning part 83 conveys the gripper 84 and the tool pot P clamped by the gripper 84 between the selection position S1 and the secondary tool standby position S2 in accordance with the rotation of the second output shaft 82c of the indexing device 82.

The gripper 84 is capable of opening and closing to clamp and unclamp the tool pot P. The gripper 84 can include, for example, a first gripper part 84a and a second gripper part 84b. The first gripper part 84a protrudes in a direction orthogonal to the axis of rotation Osh and is attached to the turning part 83. The second gripper part 84b is attached to the turning part 83 parallel to the first gripper part 84a so as to face the first gripper part 84a and is separate from the first gripper part 84a. At least one of the first gripper part 84a and the second gripper part 84b is attached to the turning part 83 so that the first gripper part 84a and the second gripper part 84b can be moved in directions facing each other (refer to FIGS. 7 to 9). Referring to FIG. 3, at least one of the first gripper part 84a and the second gripper part 84b is biased in the direction of clamping of the tool pot P by, for example, an elastic means 84c such as a coil spring. The gripper 84 has a cam follower 84d which engages with the cam groove 82j of the gripper opening and closing member 82i. The cam follower 84d can protrude from the second gripper part 84b so as to engage with the cam groove 82j.

Next, the tool exchange motions of the machine tool 100 will be described. Referring to FIG. 2, in the following motions, the shifter 80 moves the tool pot P to the selection position S1 from the secondary tool standby position S2, and returns the tool pot P to the tool magazine 51.

FIGS. 4 to 9 are schematic plan views showing portion X of FIG. 3 for detailing the motions of the shifter 80. Note that while FIG. 3 is a front view, FIGS. 4 to 9 are plan views. Furthermore, for easy comparison of FIG. 4 with FIG. 3, in the plan view of FIG. 4, the gripper 84 is rotated by 180° as compared to the plan view of FIG. 2.

Figure 4:
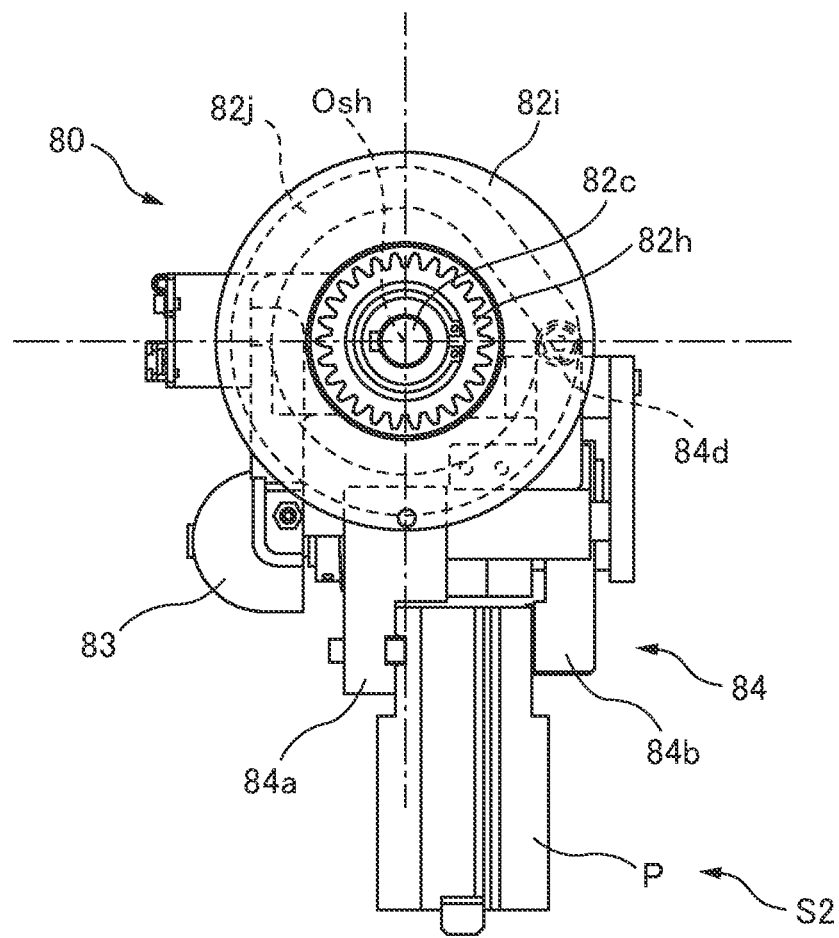
FIG. 4 is a schematic bottom view showing portion X of FIG. 3 for detailing the motions of the tool conveying device.
Figure 5:
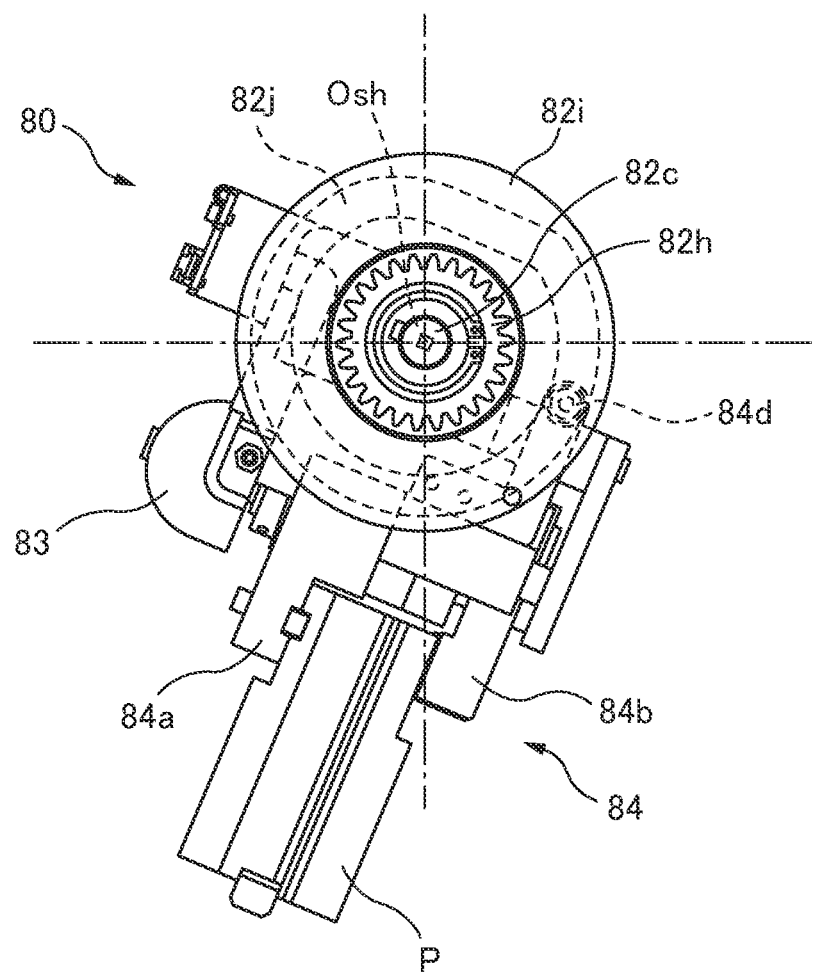
FIG. 5 is a schematic plan view showing portion X of FIG. 3 for detailing the motions of the tool conveying device.
Figure 6:
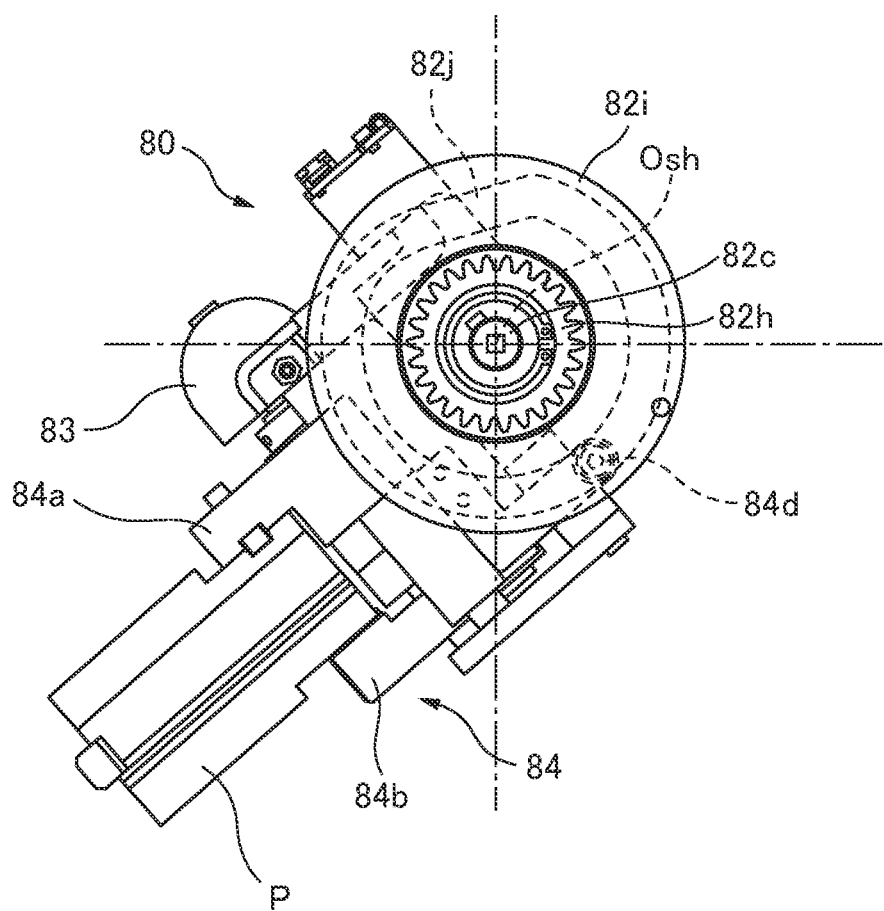
FIG. 6 is a schematic plan view showing portion X of FIG. 3 for detailing the motions of the tool conveying device.

For example, as shown in FIG. 4, when the gripper 84 is positioned in the secondary tool standby position S2, the rotation angle of the input shaft 82a (not illustrated in FIG. 4) of the indexing device 82 can be set as the origin. In the present embodiment, during the series of motions in which the gripper 84 is rotated 90° clockwise from the secondary tool standby position S2 (FIG. 4) to the selection position S1 (FIG. 7), and thereafter, the gripper 84 (FIG. 9) is unclamped, the gripper opening and closing member 82i is rotated approximately 270° counterclockwise (FIGS. 4 and 9). In other words, the indexing mechanism 82d described above has an indexing characteristic such that, among the periods during which the input shaft 82a rotates, the second output shaft 82c (i.e., the gripper 84) rotates by 90° in a period from the origin (FIG. 4) to a certain angle (FIG. 7), and the second output shaft 82c (gripper 84) stops in the remaining period (FIGS. 8 and 9).

First, referring to FIGS. 4 to 7, in such a shifter 80, the machine controller 60 sends a signal to the servo motor 81, and the servo motor 81 rotates the input shaft 82a of the indexing device 82. Due to these motions, the first output shaft 82b and the second output shaft 82c of the indexing device 82 rotate in accordance with the indexing characteristic of the indexing mechanism 82d described above. The first output shaft 82b rotates the gripper opening and closing member 82i approximately 180° counterclockwise via the first gear 82g, the second gear 82h, and the third gear 82k, while the second output shaft 82c rotates the turning part 83 and the gripper 84 90° clockwise from the secondary tool standby position S2 to the selection position S1. As a result of these motions, the tool pot P clamped by the gripper 84 is held by the tool pot holding part 51b in the selection position S1.

The cam groove 82j of the gripper opening and closing member 82i has a circular shape centered on the axis of rotation Osh so that a part of the circumference thereof is a straight linear shape. In FIGS. 4 to 7, since the cam follower 84d does not engage with the linear portion of the cam groove 82j, the gripper 84 continues to clamp the tool pot P.

Figure 7:
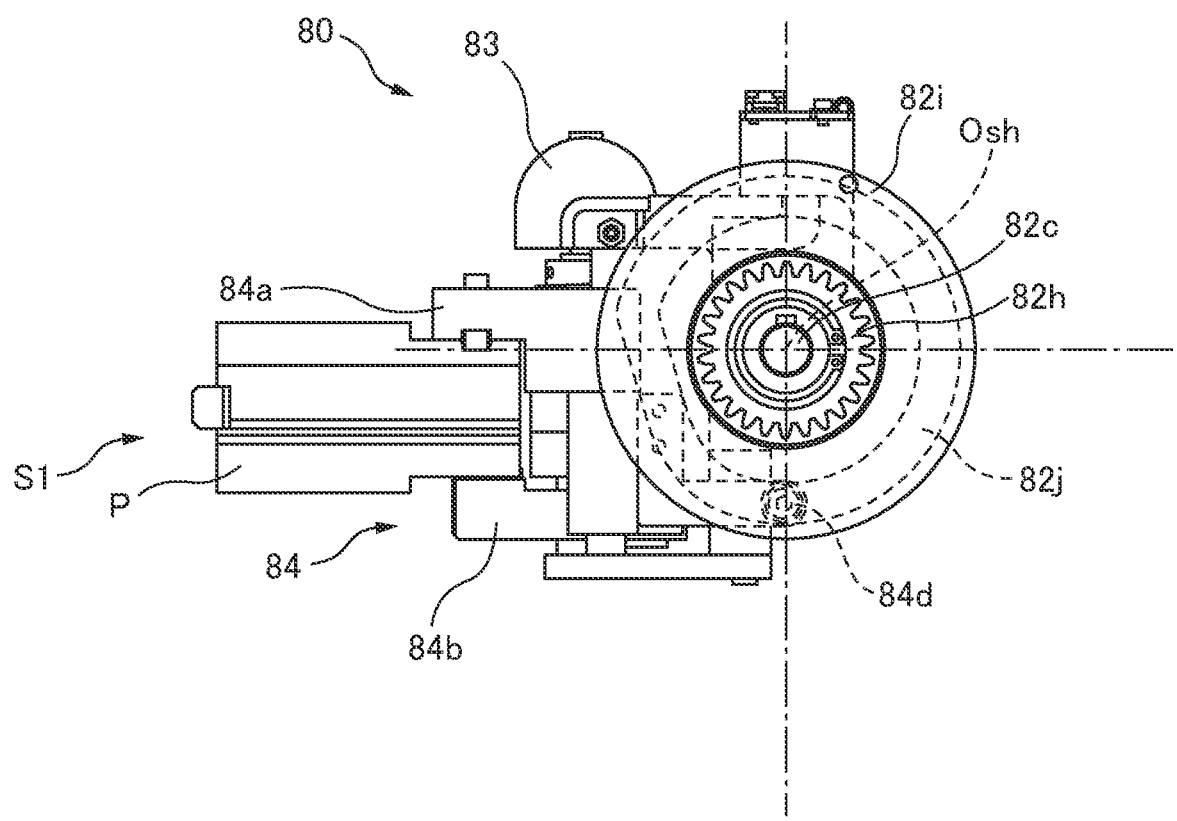
FIG. 7 is a schematic plan view showing portion X of FIG. 3 for detailing the motions of the tool conveying device.
Figure 8:
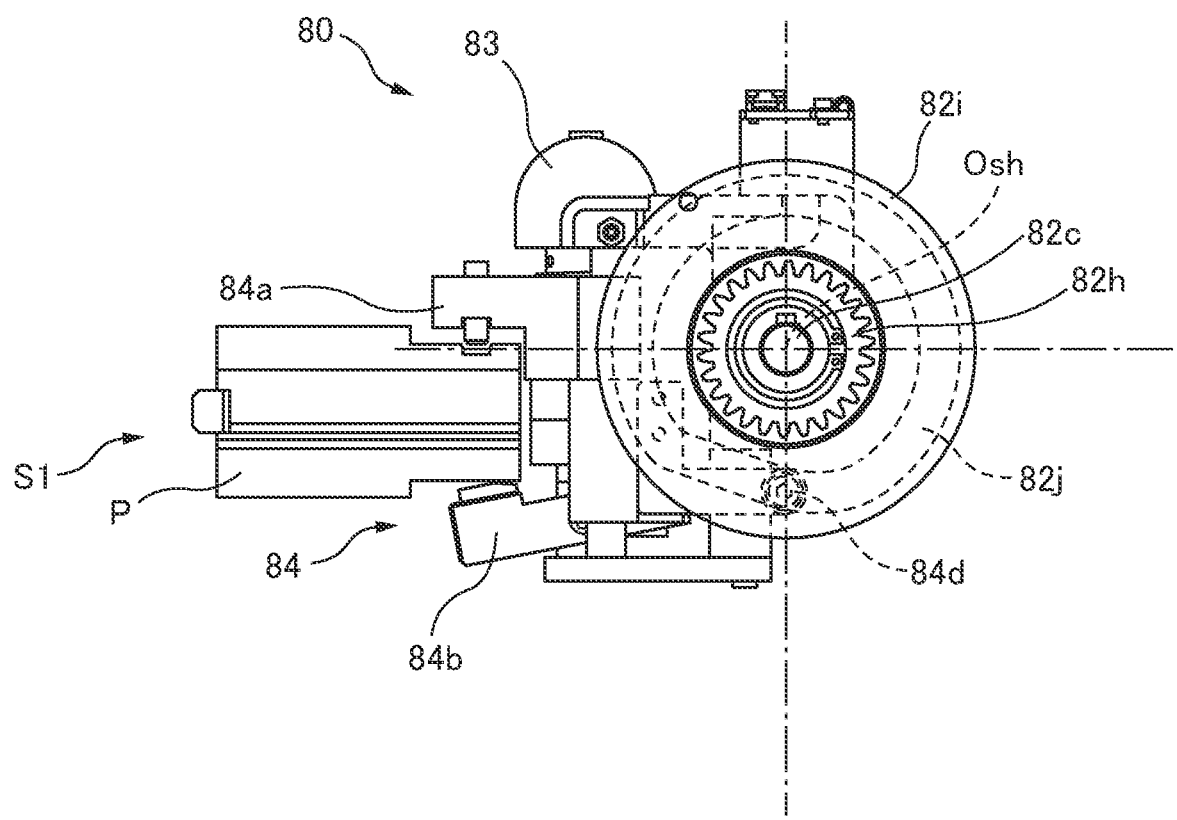
FIG. 8 is a schematic plan view showing portion X of FIG. 3 for detailing the motions of the tool conveying device.
Figure 9:
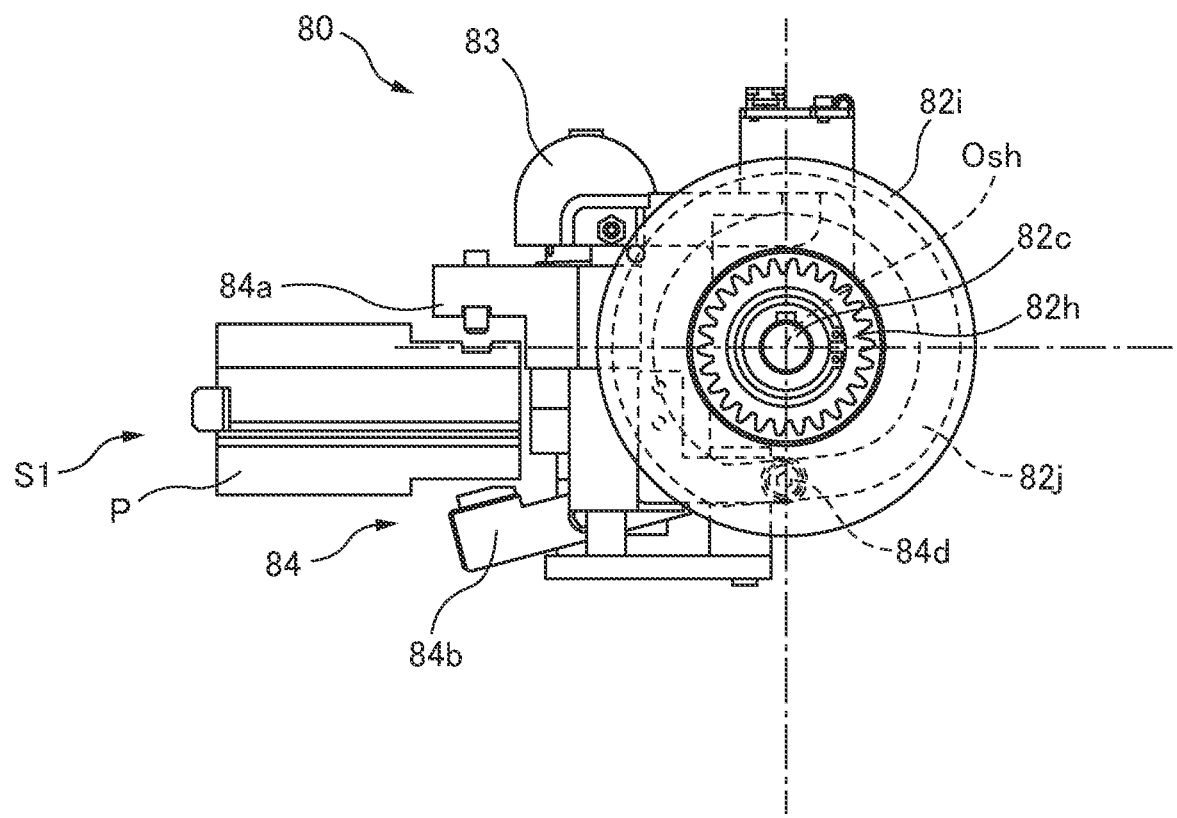
FIG. 9 is a schematic plan view showing portion X of FIG. 3 for detailing the motions of the tool conveying device.

Thereafter, referring the FIGS. 7 to 9, the machine controller 60 continues to send a signal to the servo motor 81, and the servo motor 81 continues to rotate the input shaft 82a of the indexing device 82. While the input shaft 82a rotates, the indexing mechanism 82d rotates the first output shaft 82b of the indexing device 82, and stops the second output shaft 82c (i.e., the gripper 84) at the angular position of the selection position S1. The first output shaft 82b rotates the gripper opening and closing member 82i counterclockwise via the first gear 82g, the second gear 82h, and the third gear 82k. In FIGS. 8 and 9, the cam follower 84d engages with the linear portion of the cam groove 82j, and as a result, the cam follower 84d moves toward the axis of rotation Osh against the biasing force of the elastic means 84c (not illustrated in FIGS. 8 and 9). As a result of these motions, the second gripper part 84b is opened, and the gripper 84 unclamps the tool pot P. As a result of the above motions, the tool pot P is returned to the tool magazine 51.

When the tool pot P is conveyed from the selection position S1 to the secondary tool standby position S2, by rotating the servo motor 81 in a direction opposite to the direction described above, the tool pot P can be conveyed to the secondary tool standby position S2 by motions opposite to those described above.

In the shifter 80 as described above, the turning operation and clamping operation of the tool pot P can be continuously realized by a single servo motor 81 using the indexing device 82 having the first output shaft 82b and the second output shaft 82c. Thus, a compact shifter 80 can be provided.

Furthermore, the second output shaft 82c of the indexing device 82 is positioned adjacent and parallel to the first output shaft 82b, the shifter 80 comprises a first gear 82g provided on the first output shaft 82b of the indexing device 82, and a second gear 82h arranged so as to be concentric with the second output shaft 82c of the indexing device 82 and to rotate independently of the second output shaft 82c, the second gear 82h being driven by the first gear 82g and transmitting rotation of the first output shaft 82b to the gripper opening and closing member 82i, the gripper opening and closing member 82i has the cam groove 82j formed so as to open the gripper 84 while the second output shaft 82c of the indexing device 82 is stopped and close the gripper 84 while the second output shaft 82c rotates, and the gripper 84 has the cam follower 84d engaged with the cam groove 82j. Since the first output shaft 82b and the second output shaft 82c of the indexing device 82 are arranged adjacent to each other, the installation area of the indexing device 82 is small. Furthermore, since the second gear 82h, which transmits the rotation of the first output shaft 82b of the indexing device 82 to the gripper opening and closing member 82i, is arranged concentrically with the second output shaft 82c, no additional space is needed for arrangement of the second gear 82h. Thus, a more compact shifter 80 can be provided. Furthermore, the opening and closing of the gripper 84 is achieved by the cam groove 82j and the cam follower 84d. Thus, the opening and closing of the gripper 84 can be realized with a simple structure.

Though the embodiments of the machine tool have been described, the present invention is not limited to the embodiments described above. A person skilled in the art would understand that various modifications can be made to the embodiments described above.

For example, in the embodiments described above, the third gear 82k is arranged between the first gear 82g and the second gear 82h. However, in another embodiment, the third gear may be omitted, and the first gear 82g and the second gear 82h may directly mesh. Since the turning part 83 and the gripper opening and closing member 82i turn in opposite directions when a third gear is used, and turn in the same direction when the first gear 82g and the second gear 82h directly mesh, the amount of change in the relative angular position of the gripper opening and closing member 82i with respect to the turning part 83 differs during turning, and accordingly, though it is necessary to change the shape of the cam groove 82j, the gripper 84 can clamp and unclamp the tool pot at the same angular position of the turning part 83 as described above.

REFERENCE SIGNS LIST

5 Spindle
51 Tool Magazine
80 Shifter (Tool Conveying Device)
81 Servo Motor
82 Indexing Device
82a Input Shaft
82b First Output Shaft
82c Second Output Shaft
82g First Gear
82h Second Gear
82i Gripper Opening And Closing Member
82j Cam Groove
83 Turning Part
84 Gripper
84d Cam Follower
Osp Rotational Axis of Spindle
P Tool Pot
S2 Secondary Tool Standby Position
T Tool

The invention claimed is:

1. A tool conveying device for conveying a tool pot in which a tool is held between a tool magazine and a secondary tool standby position, the tool pot being able to be conveyed so that, when the tool pot is disposed in the tool magazine, an axis of rotation of the tool is at a predetermined non-parallel angle to an axis of rotation of a spindle and so that, when the tool pot is disposed in the secondary tool standby position, the axis of rotation of the tool is parallel to the axis of rotation of the spindle, the tool conveying device comprising:

an indexing device comprising an input shaft, a first output shaft, and a second output shaft, the input shaft being connected to a servo motor, the first output shaft rotating while the input shaft rotates, the second output shaft stopping at a predetermined angular position in a certain part of a period during which the input shaft rotates and rotating during the remaining part of the period, a gripper which is affixed to the second output shaft of the indexing device, and a gripper opening and closing member which is driven by the first output shaft of the indexing device, and which is configured to open the gripper to unclamp the tool pot while the second output shaft of the indexing device is stopped and to close the gripper to clamp the tool pot while the second output shaft of the indexing device rotates, wherein:

the second output shaft of the indexing device is positioned adjacent and parallel to the first output shaft, the gripper is turned between the tool magazine and the secondary tool standby position by rotation of the second output shaft of the indexing device, the tool conveying device further comprises:
- a first gear provided on the first output shaft of the indexing device, and
- a second gear arranged to be concentric with the second output shaft of the indexing device and to rotate independently of the second output shaft, the second gear being driven by the first gear and transmitting rotation of the first output shaft of the indexing device to the gripper opening and closing member, wherein
- the gripper opening and closing member has a cam groove formed to open the gripper while the second output shaft of the indexing device is stopped and to close the gripper while the second output shaft of the indexing device rotates, and
- the gripper has a cam follower engaged with the cam groove of the gripper opening and closing member.

\* \* \* \* \*